United States Patent [19]

Mizuno

[11] Patent Number: 5,154,058
[45] Date of Patent: Oct. 13, 1992

[54] INTERNAL COMBUSTION ENGINE WITH A DUAL TURBOCHARGER SYSTEM

[75] Inventor: Hiroshi Mizuno, Susono, Japan

[73] Assignee: Toyota Jidosha Kabushiki Kaisha, Toyota, Japan

[21] Appl. No.: 713,466

[22] Filed: Jun. 11, 1991

[51] Int. Cl.[5] .............................................. F02B 37/12
[52] U.S. Cl. .................................................. 60/612; 60/600
[58] Field of Search ....................................... 60/602, 612

[56] References Cited

U.S. PATENT DOCUMENTS

| | | |
|---|---|---|
| 3,038,297 | 6/1962 | Kauffmann . |
| 4,474,008 | 10/1984 | Sakurai et al. . |
| 4,781,027 | 11/1988 | Richter et al. . |
| 4,793,140 | 12/1988 | Esch . |
| 4,982,567 | 1/1991 | Hashimoto et al. . |
| 4,993,228 | 2/1991 | Tashima et al. . |
| 5,003,781 | 4/1991 | Shibata et al. . |
| 5,005,359 | 4/1991 | Tashima et al. . |
| 5,035,114 | 7/1991 | Shibata et al. . |
| 5,036,663 | 8/1991 | Akagi et al. . |
| 5,081,842 | 1/1992 | Sugiyama et al. .................... 60/612 |
| 5,095,703 | 3/1992 | Okimoto et al. ..................... 60/612 |

FOREIGN PATENT DOCUMENTS

| | | |
|---|---|---|
| 0334228 | 9/1989 | European Pat. Off. . |
| 59-145329 | 8/1984 | Japan . |
| 60-169630 | 9/1985 | Japan . |
| 61-112734 | 5/1986 | Japan . |
| 2-191817 | 7/1990 | Japan . |
| 2-191818 | 7/1990 | Japan . |

Primary Examiner—Michael Koczo
Attorney, Agent, or Firm—Cushman, Darby & Cushman

[57] ABSTRACT

An internal combustion engine including a first turbocharger operated at all intake air quantities and a second turbocharger operated only at large air intake air quantities, an intake switching valve located downstream of the compressor of the second turbocharger, an exhaust switching valve located downstream of the turbine of the second turbocharger, and an exhaust bypass valve for bypassing the exhaust switching valve. For the purpose of running-up the second turbocharger before the operation is changed from a "one-turbocharger-operation" to a "two-turbocharger-operation", the exhaust bypass valve is partially opened and then the amount by which the exhaust bypass valve is opened is gradually increased until it is fully opened so that any torque shock accompanying the operational change is effectively suppressed.

20 Claims, 8 Drawing Sheets

INTERNAL COMBUSTION ENGINE WITH A DUAL TURBOCHARGER SYSTEM

BACKGROUND OF THE INVENTION

1. Field of the Invention

The present invention relates to an internal combustion engine with a dual turbocharger system having a first turbocharger and a second turbocharger in which the engine operation can be changed between a "one-turbocharger-operation," wherein only the first turbocharger is operated, and a "two-turbocharger-operation," wherein both the first turbocharger and the second turbocharger are operated.

2. Description of the Related Art

As illustrated in FIG. 8, a conventional turbocharged internal combustion engine 1' is provided with a first turbocharger 7' and a second turbocharger 8' having turbines 7a' and 8a', respectively, and compressors 7b' and 8b', respectively. An exhaust switching valve 17' is installed in an exhaust conduit 20b' downstream of the turbine 8a' Similarly, an intake switching valve 18' is installed in an intake conduit 14b' downstream of the compressor 8b'. Further, an intake bypass valve 33' is installed in an intake bypass conduit 13' which bypasses the compressor 8b'. The intake switching valve 18' and the exhaust switching valve 17' are closed at small to medium intake air quantities to produce a "one-turbocharger-operation" wherein only the first turbocharger 7' is operated. The intake switching valve 18' and the exhaust switching valve 17' are opened at large intake air quantities to produce a "two-turbocharger-operation" wherein both the first turbocharger 7' and the second turbocharger 8' are operated.

Japanese Patent Publication SHO 59-145328 and Japanese Patent Publication SHO 61-112734 disclose running-up the second turbocharger before the "one-turbocharger-operation" is changed to the "second-turbocharger-operation" for the purpose of suppressing torque shock by partially opening the exhaust switching valve or providing an exhaust bypass valve and opening the exhaust bypass valve.

However, there are problems with running-up of the second turbocharger.

More particularly, when the exhaust switching valve is partially opened or the exhaust bypass valve is opened, a portion of the exhaust gas begins to flow through the second turbocharger turbine and, as shown in FIG. 9, the amount of exhaust gas flowing through the first turbocharger turbine momentarily decreases. As a result, a momentary decrease in the turbocharger rotational speed occurs accompanied by a momentary decrease in the charging pressure and a momentary, relatively large torque shock when the second turbocharger begins to be run-up.

If on the other hand the amount by which the exhaust switching valve is opened is selected to be small for the purpose of suppressing the above-described torque shock, the running-up of the second turbocharger will be insufficient. As a result, as shown in FIG. 10, a large torque shock will take place when the exhaust switching valve is fully opened and the engine operation is changed from the "one-turbocharger-operation" to the "two-turbocharger-operation".

SUMMARY OF THE INVENTION

An object of the invention is to provide an internal combustion engine with a dual turbocharger system wherein torque shock at the beginning of running-up of a second turbocharger and at the operational change from a "one-turbocharger-operation" to a "two-turbocharger-operation" is suppressed.

The above-described and other objects can be attained, in accordance with the present invention, by providing a multi-cylinder internal combustion engine having an air intake and an exhaust outlet; a first and a second turbocharger arranged in parallel with each other, each including a turbine and a turbine driven compressor, the turbines being connected with the exhaust outlet and the compressors being connected with the air intake; an intake switching valve installed downstream of the second turbocharger compressor and an exhaust switching valve installed downstream of the second turbocharger turbine, the intake switching valve and the exhaust switching valve being closed at intake air quantities below a first predetermined intake air quantity, whereby only the first turbocharger is in operation, and being opened at intake air quantities above the first predetermined intake air quantity whereby both the first and the second turbochargers are in operation; an exhaust bypass conduit bypassing the exhaust switching valve and an exhaust bypass valve installed in the exhaust bypass conduit; exhaust bypass valve control means for partially opening the exhaust bypass valve and then gradually increasing the amount that the exhaust bypass valve is open whenever the exhaust bypass valve is opened; and exhaust bypass valve opening amount determining means for determining whether or not an amount by which the exhaust bypass valve is opened is equal to or greater than a predetermined opening amount and allowing both the first turbocharger and the second turbocharger to operate only when the opening amount by which the exhaust bypass valve is open is equal to or greater than the predetermined opening amount.

In the above-described internal combustion engine with a dual turbocharger system, since the exhaust bypass valve is partially opened at first, the amount of exhaust gas flowing through the second turbocharger turbine is small and the quantity of the exhaust gas flowing through the first turbocharger is fairly large at the early stages of the opening of the exhaust bypass valve. As a result, any decrease in the rotational speed of the first turbocharger and any resulting torque shock at the early stages of the opening of the exhaust bypass valve will be suppressed. Further, since the amount by which the exhaust bypass valve is opened is gradually increased, the exhaust bypass valve will be fully opened before the "one-turbocharger-operation" is changed to the "two-turbocharger-operation". As a result, the second turbocharger will be sufficiently run-up when the "one-turbochager-operation" is changed to the "two-turbocharger-operation", and any decrease in the charging pressure and any accompanying torque shock at the operation change from the "one-turbocharger-operation" to the "two-turbocharger-operation" will be sufficiently small.

BRIEF DESCRIPTION OF THE DRAWINGS

The above described object and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENT

Figure 4:
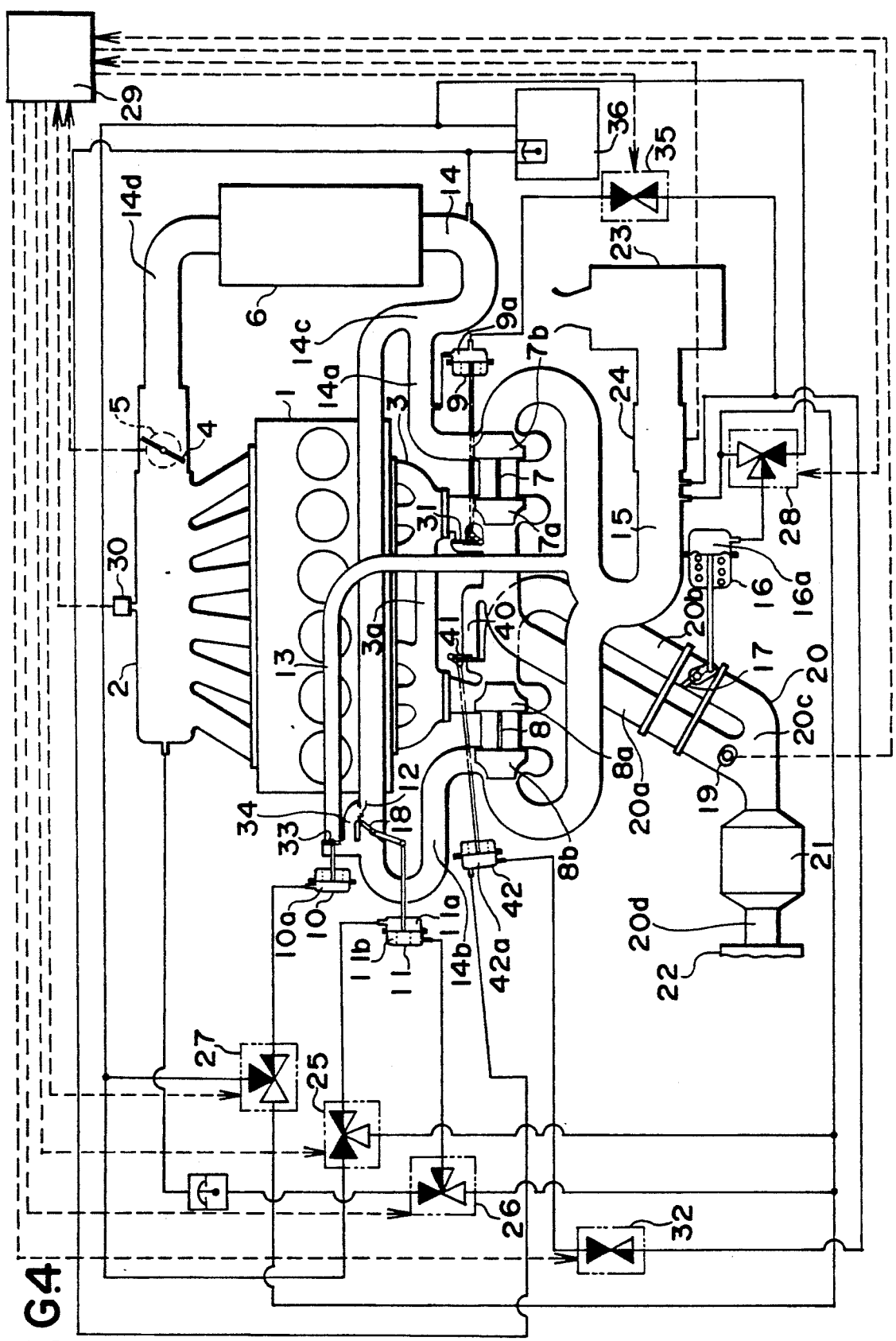
FIG. 4 is a schematic view of the internal combustion engine with a dual turbocharger system having the control systems of FIGS. 1, 2 and 3.
Figure 5:
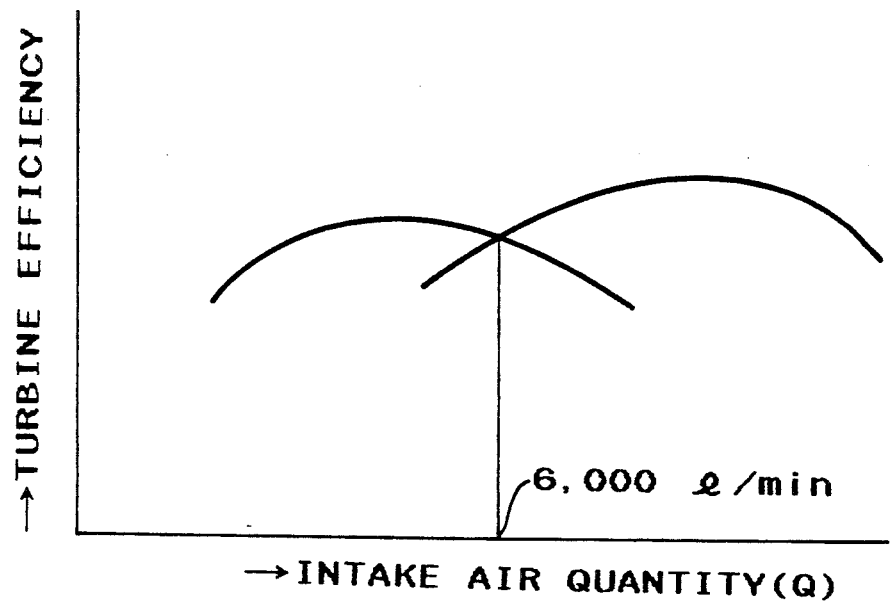
FIG. 5 is a graphical representation of turbine efficiency versus an intake air quantity map of the internal combustion engine with a dual turbocharger system of FIG. 4.

As illustrated in FIG. 4, the internal combustion engine with a dual turbocharger system provided in accordance with one embodiment of the present invention is a multi-cylinder engine, for example, a six-cylinder internal combustion engine 1 with an air intake and an exhaust outlet. The cylinders of the engine 1 are grouped into two groups. An exhaust manifold 3 is connected to the engine exhaust outlets and includes a first portion connected with a first group of engine cylinders and a second portion connected with a second group of engine cylinders. The first and second portions of the exhaust manifold 3 communicate with each other via connecting conduit 3a.

A first turbocharger 7 and a second turbocharger 8 are provided so as to be in parallel with each other. The first turbocharger 7 is operated irrespective of the amount of intake air, and as a rule, the second turbocharger is operated only at large intake air amounts. The first turbocharger 7 includes a turbine 7a and a compressor 7b driven by the turbine 7a. Similarly, the second turbocharger 8 includes a turbine 8a and a compressor 8b driven by the turbine 8a. The turbine 7a is connected with the first portion of the exhaust manifold 3 and the turbine 8a is connected with the second portion of the exhaust manifold 3. As a result, the first and second turbines 7a and 8a are connected with the engine exhaust outlet via exhaust manifold 3. On the other hand, the compressor 7b and the compressor 8b are connected with the air intake of the engine 1 via an intake line.

The intake line connected with the engine air intake includes a first intake passage 15 positioned upstream of the compressors 7b and 8b and a second intake passage 14 positioned downstream of the compressors 7b and 8b. Further, the second intake passage 14 includes a first intake conduit 14a located downstream of and connected to the compressor 7b, a second intake conduit 14b located downstream of and connected to the compressor 8b, a connecting portion 14, where the first intake conduit 14a and the second intake conduit 14b join each other, and a common intake conduit 14d connecting the connecting portion 14c with the engine air intake. In the first intake passage 15, an air cleaner 23 and an air flow meter 24 are installed in that order in an intake air flow direction. An intercooler 6, a throttle valve 4, and a surge tank 2 are also installed, in the intake air flow direction, respectively, in the common intake conduit 14d.

An exhaust line 20 is connected to the engine exhaust outlets and includes a first exhaust conduit 20a connected to the first portion of the exhaust manifold 3, in which the turbine 7a is installed, a second exhaust conduit 20b connected to the second portion of the exhaust manifold 3, in which the turbine 8a is installed, a connecting portion 20c where the first conduit 20a and the second exhaust conduit 20b join one another, and an exhaust pipe 20d located downstream of and connected to the connecting portion 20c. In the exhaust pipe 20d, a catalytic converter 21 and an exhaust muffler 22 are installed in an exhaust gas flow direction, respectively. Further, at connecting portion 20c or in the vicinity of connecting portion 20c, an oxygen sensor 19 is installed.

For the purpose of switching the operation between a "one-turbocharger-operation", in which only the first turbocharger 7 is operated at small to medium intake air amounts or quantities, and a "two-turbocharger-operation", in which both the first turbocharger 7 and the second turbocharger 8 are operated at large intake air quantities, an exhaust switching valve 17 is installed in the second exhaust conduit 20b downstream of the turbine 8a, and an intake switching valve 18 is installed in the second intake conduit 14b downstream of the compressor 8b. When both the exhaust switching valve 17 and the intake switching valve 18 are closed, the operation of the second turbocharger 8 is stopped and only the first turbocharger 7 is in operation. In contrast, when both the exhaust switching valve 17 and the intake switching valve 18 are opened, both the first turbocharger 7 and the second turbocharger 8 are in operation.

For the purpose of minimizing the shock which typically accompanies the transition from the "one-turbocharger-operation" to the "two-turbocharger-operation", the second turbocharger 18 should be run-up before it is fully rotated. In the conventional turbocharged engine, this running-up of the second turbocharger 8 is achieved by partially opening the exhaust switching valve. In the present invention, however, an exhaust bypass conduit 40 is provided bypassing the exhaust switching valve 17, and the running-up of the second turbocharger 8 is achieved by opening an exhaust bypass valve 41 installed in the exhaust bypass conduit 40. More particularly, when the exhaust bypass valve 41 is opened, a relatively small amount of exhaust gas flows through the exhaust bypass conduit 40 such that the second turbocharger 8 can be run-up. When the exhaust switching valve 17 is opened, the rotational speed of the second turbocharger 8 is increased from a run-up rotational speed and not from a standstill whereby the transition shock is effectively suppressed.

The exhaust switching valve 17 and the exhaust bypass valve 41 are provided downstream of the second turbocharger turbine 8a. Since the turbine 8a absorbs the thermal energy of the exhaust gas flowing through the turbine 8a, exhaust gas at a relatively low temperature flows through the exhaust switching valve 17 and the exhaust bypass valve 41 thereby increasing the durability of the exhaust switching valve 17 and the exhaust bypass valve 41.

Figure 7:
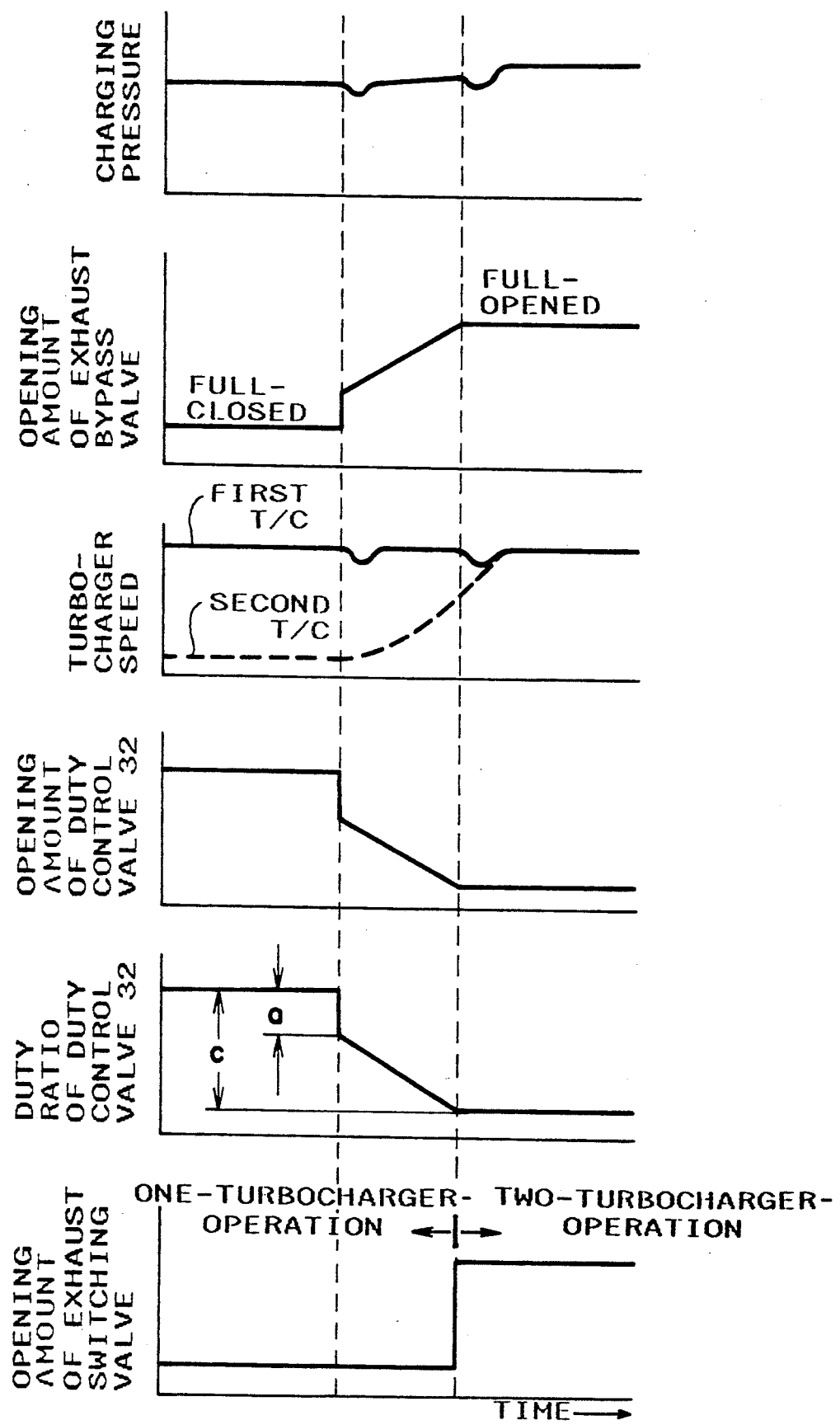
FIG. 7 is a graphical representation of a charging pressure, an opening amount of the exhaust bypass valve, a turbocharger speed, an opening degree of a duty control valve, a duty ratio of the duty control valve, and an opening amount of an exhaust switching valve versus an elapsed time map of the internal combustion engine with a dual turbocharger system of FIG. 4.
Figure 8:
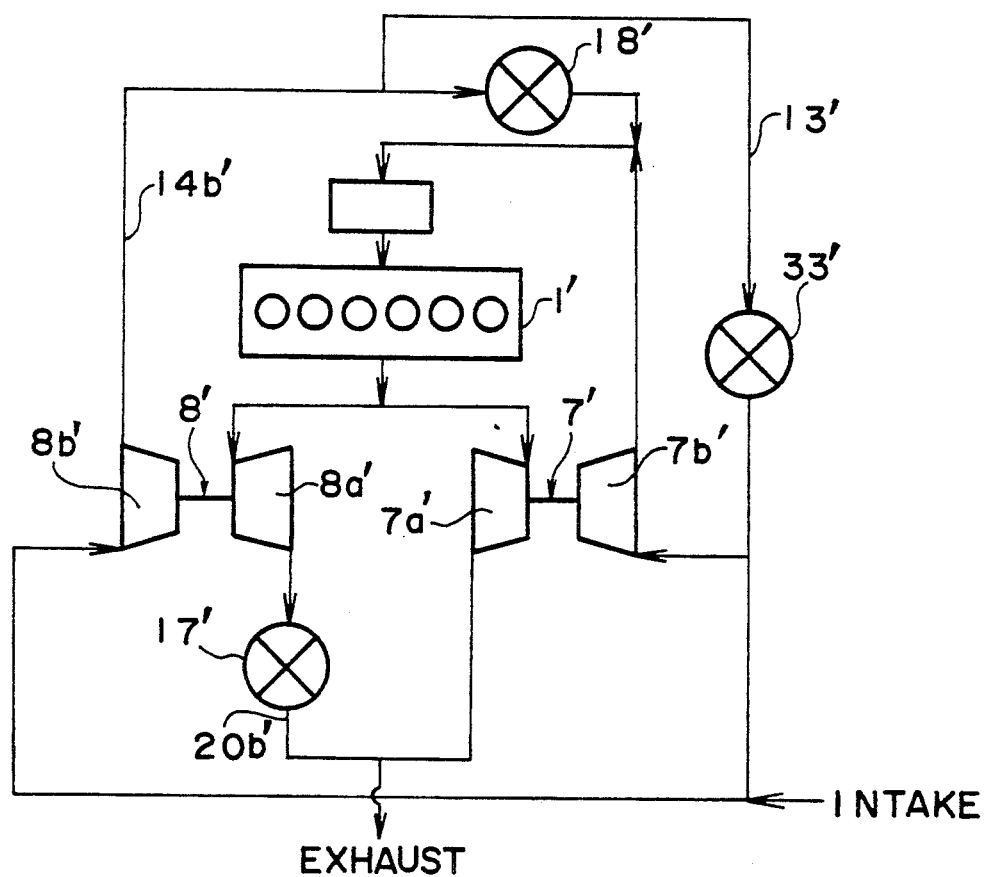
FIG. 8 is a system diagram of a conventional engine with a dual turbocharger system.
Figure 9:
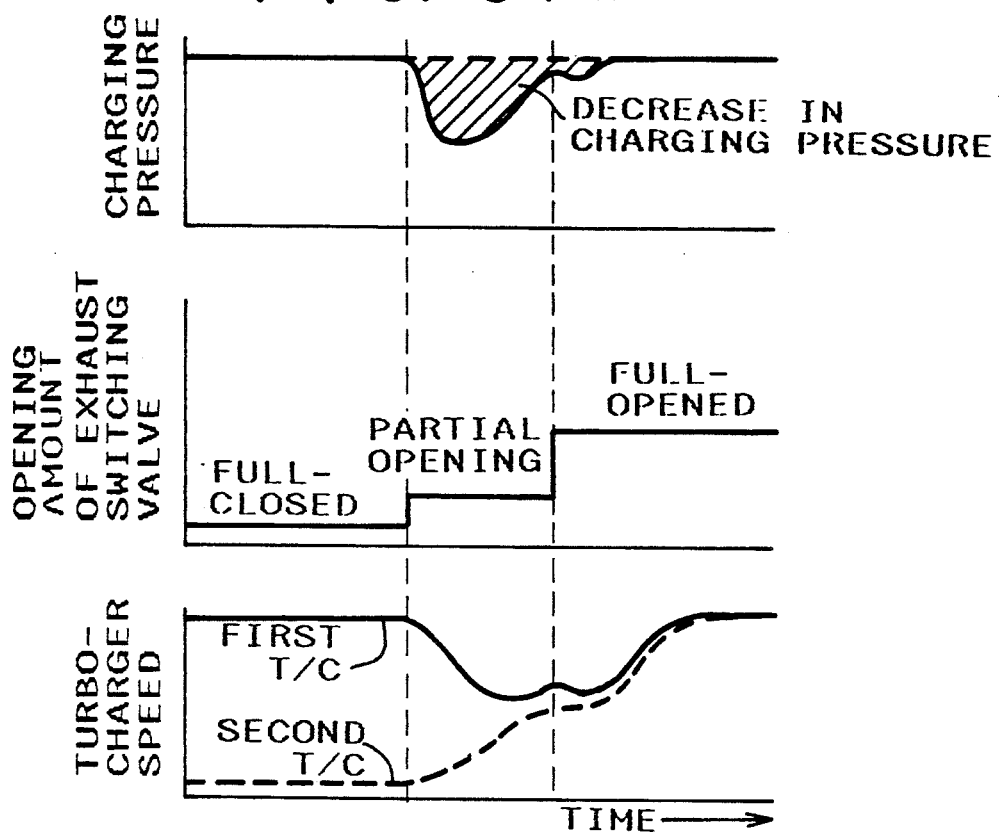
FIG. 9 is a charging pressure, an opening amount of an exhaust switching valve, and a turbocharger speed versus an elapsed time map of the conventional engine with a dual turbocharger system of FIG. 8.
Figure 10:
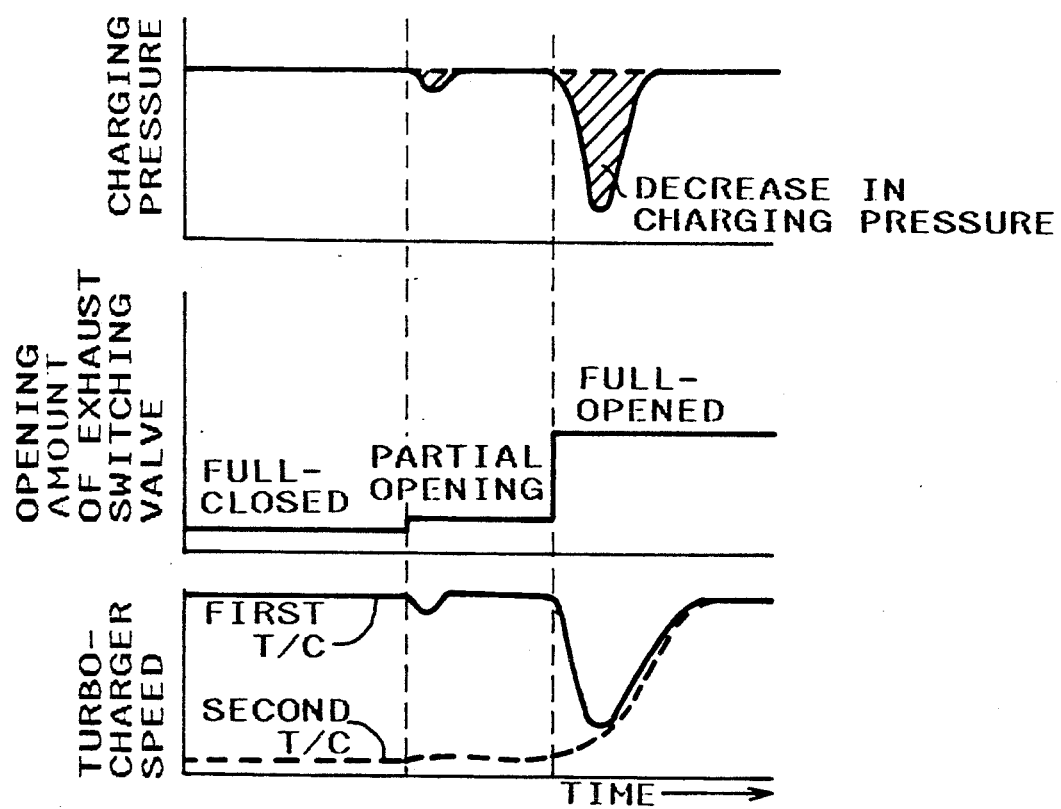
FIG. 10 is a charging pressure, an opening amount of an exhaust switching valve, and a turbocharger speed versus an elapsed time map of the conventional engine with a dual turbocharger system of FIG. 8.

The exhaust bypass valve 41 is adapted to be partially opened at first and then the amount by which the exhaust bypass valve 41 is opened is gradually increased to the full opening degree as illustrated in FIG. 7. More particularly, as illustrated in FIG. 4, a diaphragm actuator 42 is coupled to the exhaust bypass valve 41 so as to selectively open and close the exhaust bypass valve 41. The diaphragm actuator 42 includes a diaphragm chamber 42a connected to both a positive pressure tank 36 and the intake passage 15 which is at substantially atmospheric pressure. A duty control two-way solenoid valve 32 is installed in the conduit connecting the diaphragm chamber 42a and the intake passage 15. As illustrated in FIG. 7, the duty ratio of the duty control valve 32 is changed between a first value, ratio "c", which corresponds to full opening of the duty control valve 32 and closure of the exhaust bypass valve 41 and a second value, ratio "zero", which corresponds to closure of the duty control valve 32 and full opening of the exhaust switching valve 41.

When the second turbocharger 8 is preliminarily rotated and the intake switching valve 18 is closed, a portion of the pressurized air located in the second intake conduit 14b between the compressor 8b and the intake switching valve 18, will leak through the compressor 8b and flow to a portion of the intake conduit upstream of the compressor 8b. The leaked air will then again be driven by the compressor 8b and compressed into the portion of the intake conduit downstream of the compressor 8b. This leakage and re-pressurization of the intake air repeats continually and undesirably increases the temperature of the intake air and, thus, the temperature of the impeller of the compressor 8b itself. To prevent such temperature increases, an intake bypass conduit 13 is provided to bypass the compressor 8b of the second turbocharger 8. More particularly, the intake bypass conduit 13 connects the portion of the second intake conduit 14b positioned between the compressor 8b and the intake switching valve 18 with the first intake passage 15 upstream of the compressors 7b and 8b. An intake bypass valve 33 is installed in, and is adapted to open and close, the intake bypass conduit 13. When the second turbocharger 8 is preliminarily rotated, the intake bypass valve 33 is opened to minimize the intake air temperature rise.

An intake switching valve bypass conduit 34 is provided to connect a portion of the second intake conduit 14b positioned upstream of the intake switching valve 18 with a portion of the second intake conduit 14b positioned downstream of the intake switching valve 18 to bypass the intake switching valve 18. A check valve (a one-way valve) 12 is installed in the intake switching valve bypass conduit 34. The check valve 12 permits the intake air to flow in the direction from the portion of the second intake conduit 14b positioned upstream of the intake switching valve 18 toward the portion of the second intake conduit 14b positioned downstream of the intake switching valve 18. As a result, when the intake switching valve 18 is closed and the compressor outlet pressure of the second turbocharger 8 grows to exceed a compressor outlet pressure of the first turbocharger 7, the check valve 12 opens the bypass conduit 34 and permits the intake air to flow therethrough. Further, the turbine 7a is provided with a waste gate valve 31. The positive pressure tank 36 is provided so as to be connected with a portion of the common intake conduit 14d upstream of the intercooler 6 and to hold a charging pressure therein.

Various actuators are provided to operate the above-described valves. More particularly, the waste gate valve 31 is operated by an actuator 9, the intake bypass valve 33 is operated by an actuator 10, the intake switching valve 18 is operated by an actuator 11, and the exhaust switching valve 17 is operated by an actuator 16. As illustrated, the exhaust bypass valve 41 is operated by the actuator 42. Each of these actuators comprises a single diaphragm-type actuator.

Various three-way or two-way solenoid valves 25, 26, 27, 28, 32 and 35 are provided to switch the actuators 9, 10, 11, 16, and 42 on and off. As illustrated, the valve 32 is a duty control valve. These solenoid valves 25, 26, 27, 28, 32 and 35 operate according to instructions from an engine control computer 29. In this instance, either the "ON" state of the three-way solenoid valve 25 or the "ON" state of the three-way valve 26 actuates the actuator 11 to open the intake switching valve 18, and either the "OFF" state of the three-way solenoid valve 25 or the "OFF" state of the three-way solenoid valve 26 actuates the actuator 11 to close the intake switching valve 18. More particularly, the intake air switching valve operating means includes the diaphragm actuator 11, the three-way solenoid valve 25, and the three-way solenoid valve 26. The diaphragm actuator 11 includes a diaphragm operatively coupled to the intake switching valve 18, a first chamber 11a on one side of the diaphragm, and a second chamber 11b on another side of the diaphragm. The solenoid valve 25 is connected to the first chamber 11a and is adapted to switch between connecting a positive pressure from the positive pressure tank 36 to the first chamber 11a at large intake air quantities to open the intake switching valve 18 and connecting atmospheric pressure to the first chamber 11a at small to medium intake air quantities and at small to medium engine speeds to close the intake switching valve 18. The three-way solenoid valve 26 is connected to the second chamber 11b and is adapted to switch between connecting atmospheric pressure to the second chamber 11b at high engine loads to close the intake switching valve 18 and connecting a negative pressure from the surge tank 2 to the second chamber 11b at low engine loads to open the intake switching valve 18 despite the small to medium intake air quantities.

Similarly, the "ON" state of the three-way solenoid valve 28 actuates the actuator 16 to open the exhaust switching valve 17, and the "OFF" state of the three-way solenoid valve 28 actuates the actuator 16 to close the exhaust switching valve 17. The "ON" state of the three-way solenoid valve 27 actuates the actuator 10 to close the intake bypass valve 33, and the "OFF" state of the three-way solenoid valve 27 actuates the actuator 10 to open the intake bypass valve 33. Further, the actuator 16 includes a diaphragm chamber 16a, the actuator 10 includes a diaphragm chamber 10a, the actuator 11 includes diaphragm chambers 11a and 11b, and the actuator 9 includes a diaphragm chamber 9a. As illustrated, the actuator 42 includes the diaphragm chamber 42a.

As illustrated in FIG. 7, closure of the duty control two-way solenoid valve 32 by duty control actuates the actuator 42 to open the exhaust bypass valve 41, and opening of the duty control two-way solenoid valve 32 by duty control actutates the actuator 42 to close the exhaust bypass valve 41.

Various sensors for sensing the engine operating conditions are provided and the outputs of the sensors are fed to the engine control computer 29. More particularly, the various sensors include an intake pressure sensor 30, a throttle opening degree detecting sensor 5, an intake air quantity detecting sensor such as an air flow meter 24, the aforementioned oxygen sensor 19, an engine speed sensor or crank angle sensor (not shown in particular), and a vehicle speed sensor (not shown in particular).

Figure 1:
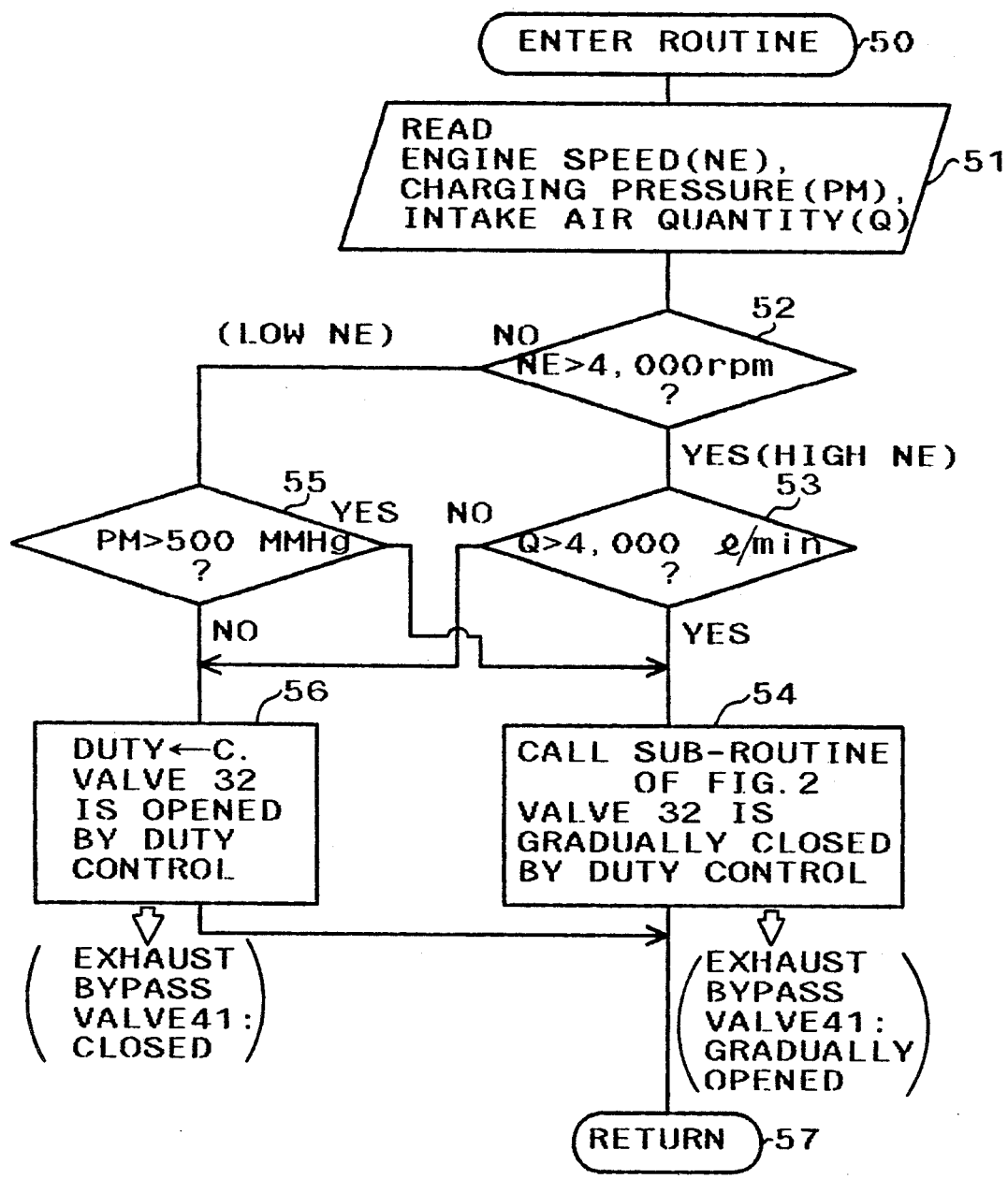
FIG. 1 is a flow chart illustrating a control for selectively opening and closing of an exhaust bypass valve installed in an internal combustion engine with a dual turbocharger system in accordance with one embodiment of the invention.
Figure 2:
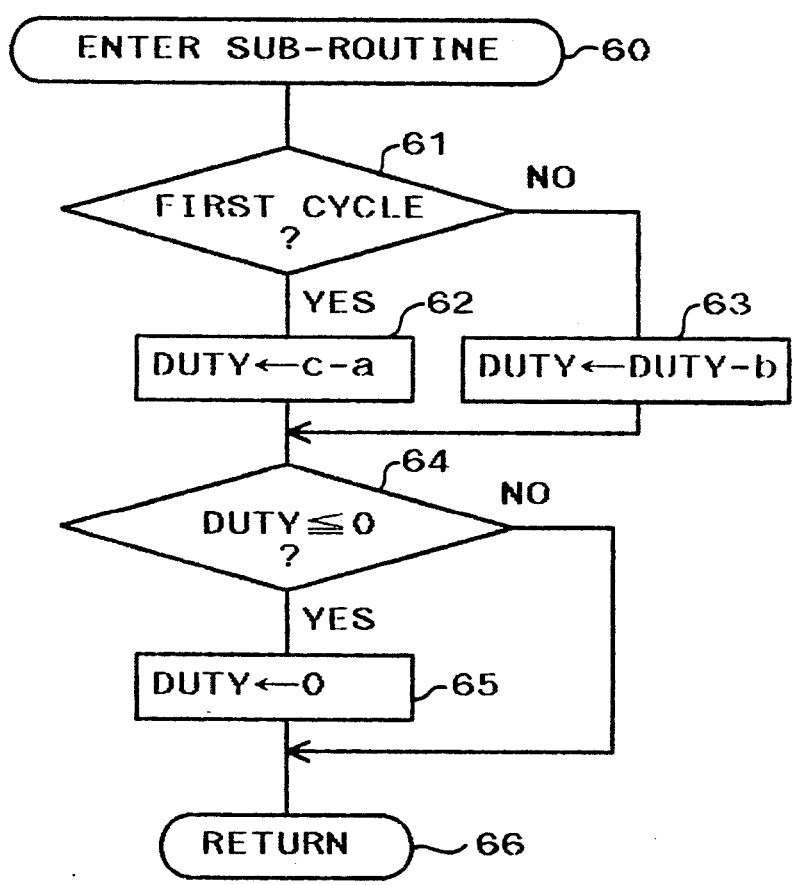
FIG. 2 is a flow chart illustrating a control for partially opening the exhaust bypass valve and then changing the amount by which the exhaust bypass valve of the internal combustion engine with a dual turbocharger system is opened, in accordance with one embodiment of the invention.
Figure 3:
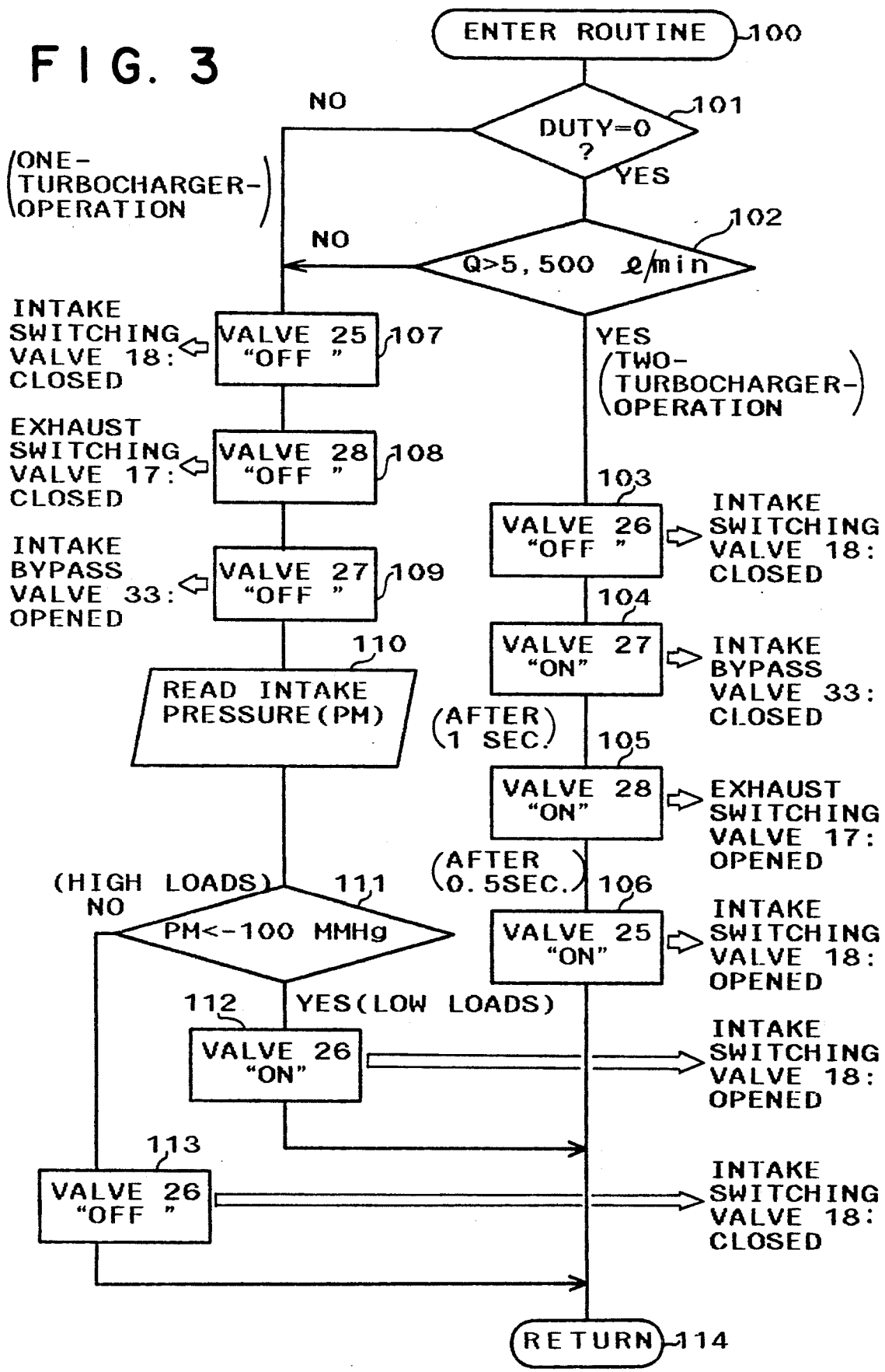
FIG. 3 is a flow chart illustrating a control for an operation change between a "one-turbocharger-operation" and a "two-turbocharger-operation" of the internal combustion engine with a dual turbocharger system in accordance with one embodiment of the invention.

The engine control computer 29 includes a central processor unit (CPU), a read-only memory (ROM), a random access memory (RAM), and input and output interface (I/0 interface), and an analogue/digital convertor (A/D convertor) as a typical micro computer. FIGS. 1, 2 and 3 illustrate programs according to which the turbocharged internal combustion engine is operated. The programs of FIGS. 1 through 3 are stored in the ROM and are fed into the CPU where the routines are executed to operate the above-described valves and actuators.

Control structures and operation of the turbocharged engine will now be explained with reference to FIGS. 1 through 3. The routine of FIG. 1 is entered at step 50. Then, at step 51, the current engine speed NE which is an output signal from the engine speed sensor, the current intake air quantity Q, which is an output signal from the air flow meter 24, and the current charging pressure PM, which is an output signal from the intake pressure sensor 30, are entered in the computer, respectively. Then, the routine proceeds to step 52, where whether or not the current engine speed NE is higher than a predetermined engine speed, for example 4,000 rpm, is determined.

When the engine speed is at or below the predetermined engine speed at step 52, the routine proceeds to step 55, where whether or not the current intake pressure PM is higher than a first predetermined charging pressure, for example 500 mm HG, is determined. If the charging pressure PM is determined to be higher than the first predetermined charging pressure at step 55, then the routine proceeds to step 54, where a sub-routine of FIG. 2 is called for the purpose of running-up the second turbocharger 8 so that the duty control two-way solenoid valve 32 is first partially closed and then is gradually closed until it is fully closed so that the exhaust bypass valve 41 is first partially opened and then is gradually opened until it is fully opened. If the charging pressure PM is equal to or lower than the first predetermined charging pressure at step 55, then the routine proceeds to step 56, wherein the duty control two-way solenoid valve 32 is opened so that the exhaust bypass valve 41 is closed.

When the engine speed is higher than the predetermined engine speed at step 52, the routine proceeds to a step 53, where whether or not the current intake air quantity Q is larger than a second predetermined intake air quantity, for example 4,000 l/min, is determined. (A "first" predetermined intake air quantity is discussed below with reference to step 102 of FIG. 3.) If the intake air quantity Q is larger than the second predetermined intake air quantity at step 53, then the routine proceeds to step 54, where the sub-routine of FIG. 2 is called so that the exhaust bypass valve 41 is gradually opened. If the intake air quantity Q is equal to or smaller than the second predetermined intake air quantity at step 53, then the routine proceeds to step 56 and the exhaust bypass valve 41 is closed. From steps 54 and 56, the routine proceeds to step 57 and goes to step 100 of a routine of FIG. 3.

Figure 6:
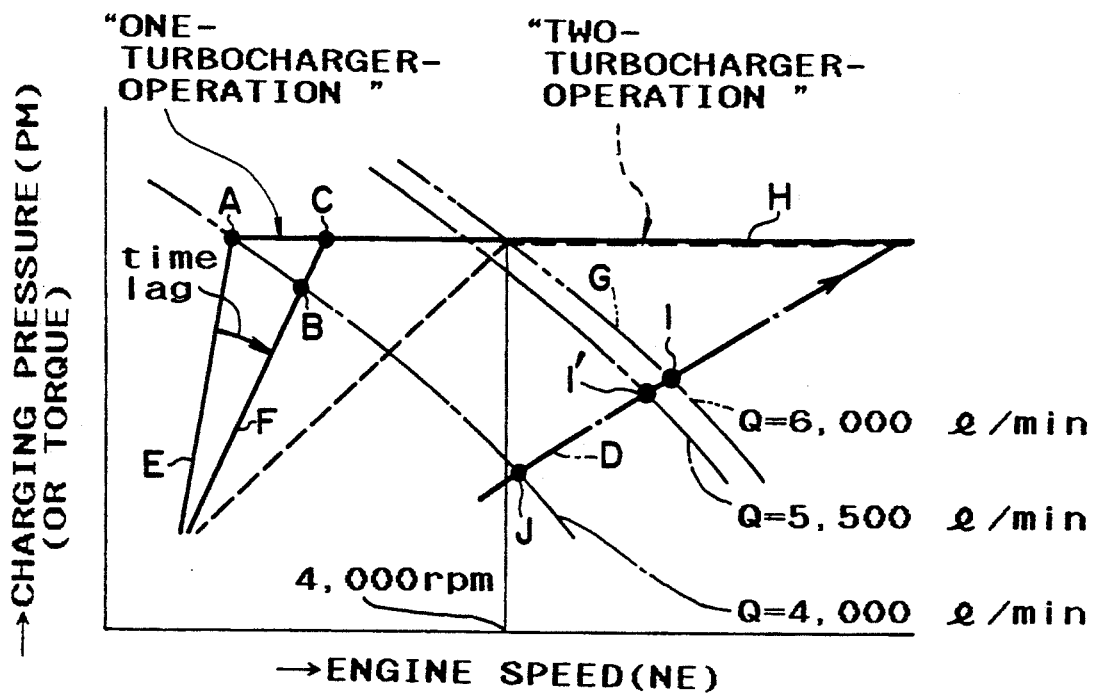
FIG. 6 is a graphical representation of charging pressure versus an engine speed map of the internal combustion engine with a dual turbocharger system of FIG. 4.

In the routine of FIG. 1, steps 52, 53, and 55 constitute first exhaust bypass valve control means for determining a condition for opening and closing the exhaust bypass valve 41 on the basis of a charging pressure at engine speeds at or below the predetermined engine speed and on the basis of an intake air quantity at engine speeds greater than the predetermined engine speed. In this instance, if the opening condition of the exhaust bypass valve 41 were controlled only on the basis of an intake air quantity, a decrease in torque would take place at the transition from "one-turbocharger-operation" to "two-turbocharger-operation". More particularly, as illustrated in FIG. 6, when the exhaust bypass valve 41 is set to open, for example, at 4,000 l/min, the exhaust bypass valve opening point shifts from point A to point B due to a turbocharger time lag, because an NE-PM line changes from line E to line F when the engine speed increases. As a result, the exhaust bypass valve 41 would open at a charging pressure (point B) lower than 500 mm Hg (point C). Once the exhaust bypass valve 41 is opened at point B, the charging pressure would not increase to 500 mm Hg because one portion of the intake air flows to the second turbocharger 8 and therefore the first turbocharger 7 is not fully driven. Therefore, the engine operation will be changed from "one-turbocharger-operation" to "two-turbocharger-operation" at a charging pressure lower than 500 mm Hg, and a decrease in torque will occur during the transition.

On the other hand, if the opening condition of the exhaust bypass valve 41 were controlled only on the basis of a charging pressure, that is, if the exhaust bypass valve 41 were opened only after the charging pressure reached 500 mm Hg, the exhaust bypass valve 41 would not open at high engine speeds until after the turbine operation changes from "one-turbocharger-operation" to "two-turbocharger-operation". This change would be accompanied by a relatively great torque shock. More particularly, in FIG. 6, when the charging pressure versus engine speed characteristic increases alone line D at high engine speeds, the characteristic crosses the intake air quantity line G of 6,000 l/min before it reaches the charging pressure line H of 500 mm Hg. Therefore, before the charging pressure can reach 500 mm Hg, the engine operation will be changed from "one-turbocharger-operation" to "two-turbocharger-operation" at point I which is the intersection of lines D and G. The actual valve switching operation should be done at point I'; the intersection of line D and the 5,500 l/min line, taking the time lag into consideration. This means that a step of running-up the second turbocharger 8 will be skipped.

However, in the control of FIG. 1, since the opening of the exhaust bypass valve 41 is determined on the basis of a charging pressure at engine speeds at or below the predetermined engine speed, for example 4,000 rpm, and is determined on the basis of an intake air quantity at engine speeds greater than the predetermined engine speed, the above-described problems are avoided. More particularly, at relatively low engine speeds, the charging pressure versus engine speed characteristic changes along line F and the engine operation is changed from the "one-turbocharger-operation" to the "two-turbocharger-operation" at point C (not at point B). As a result, the charging pressure can rise up to 500 mm Hg, and no decrease in torque will occur during the transition. On the other hand, at relatively high engine speeds, the charging pressure versus engine speed characteristic changes along line D and the exhaust bypass valve 41 is opened at point J, which is the intersection of line D and the 4,000 l/min line, to begin to run-up the second turcocharger 8 before the engine operation is changed from "one-turbocharger-operation" to "two-turbocharger-operation" at point I.

FIG. 2 illustrates a sub-routine called at step 54 of FIG. 1. The sub-routine of FIG. 2 is entered at step 60. Then, the routine proceeds to step 61, where whether or not the current cycle is a first cycle is determined. If the current cycle is determined to be a first entered cycle at step 61, the routine proceeds to step 62, where the duty ratio "DUTY" of the duty control two-way solenoid valve 32 is set to a value "c-a" so that the duty control valve 32 is partially closed and the exhaust bypass valve 41 is partially opened (see FIG. 7). If the current cycle is determined to be a second or successive cycle at step 61, the routine proceeds to step 63, where the current duty ratio "DUTY" of the duty control two-way solenoid valve 32 is set to a value "DUTY - b" so that the duty ratio decreases by "b" per cycle. In accordance with the reduction of the duty ratio, the amount by which the duty control two-way solenoid valve 32 is opened is gradually decreased and the amount by which the exhaust bypass valve 41 is opened is gradually increased.

Then, the routine proceeds to step 64, where whether or not the current duty ratio "DUTY" of the duty control valve 32 is equal to or less than zero is determined. In this instance, the "DUTY" being zero corresponds to the full-closure of the duty control two-way solenoid valve 32 and the full-opening of the exhaust bypass valve 41. When the duty ratio "DUTY" is determined to be equal to or less than zero at step 64, the routine proceeds to step 65, where the "DUTY" is set to zero. When the "DUTY" is determined to be greater than zero, the routine proceeds to step 66 and returns to the routine of FIG. 1.

With the second exhaust bypass valve control means of FIG. 2, both torque shock caused at the beginning of the running-up of the second turbocharger 8 and torque shock caused at the change from "one-turbocharger-operation" to "two-turbocharger-operation" are effectively suppressed. More particularly, as illustrated in FIG. 7, the exhaust bypass valve 41 is partially opened at first so that only a relatively small amount of exhaust gas flows through the second turbocharger 8 and a relatively large amount of exhaust gas continues to flow through the first turbocharger 7. Therefore, a decrease in the rotational speed of the first turbocharger 7 at the beginning of the running-up of the second turbocharger 8 is suppressed. As a result, any decrease in the charging pressure and any torque shock accompanying the speed change of the first turbocharger 7 are also suppressed. Also, as illustrated in FIG. 7, since the amount by which the exhaust bypass valve 41 is opened is gradually increased until it is fully opened, the second turbocharger 8 has been sufficiently run-up when the engine operation is changed from "one-turbocharger-operation" to "two-turbocharger-operation". As a result, any decrease in the charging pressure and any torque shock are small at the transition from "one-turbocharger-operation" to "two-turbocharger-operation".

The routine of FIG. 3 is entered at step 100. Then, at step 101, whether or not the current duty ratio "DUTY" is equal to zero is determined. When the "DUTY" is determined to be equal to zero at step 101 and therefore the exhaust bypass valve 41 is fully opened, the routine proceeds to step 102 where whether or not the current engine operational condition is a condition to be operated under the "two-turbocharger-operation" is determined. When "DUTY" is determined to be greater than zero at step 101 and therefore the exhaust bypass valve 41 is not fully opened, the routine proceeds to step 107 because running-up of the second turbocharger 8 is insufficient and the exhaust switching valve 17 should not yet been opened. The step 101 constitutes an exhaust bypass valve opening amount determining means for determining whether or not an amount by which the exhaust bypass valve 41 is opened is equal to or greater than a predetermined opening amount and allowing both the first turbocharger 7 and the second turbocharger 8 to operate only when the opening amount by which the exhaust bypass valve 41 is equal to or greater than the predetermined opening amount.

At step 102, it is determined whether or not the intake air quantity Q is larger than a predetermined intake air quantity, for example 5,500 l/min, that is, whether or not the current engine operational condition is a condition to be operated under "two-turbocharger-operation". More particularly, when Q is larger than 5,500 l/min, the current condition is deemed to be a condition requiring a "two-turbocharger-operation". However, since there is a time lag for the charging pressure to reach 500 mm Hg after the valves 17 and 18 are switched, switching of the valves 17 and 18 should be executed at 5,500 l/min rather than at 6,000 l/min as shown in step 102 of FIG. 3 so that the actual switching from "one-turbocharger-operation" to "two-turbocharger-operation" will occur at about 6,000 l/min.

When the current engine operational condition is determined to be a condition requiring a "two-turbocharger-operation" at step 102, the routine proceeds to step 103. At step 103, in the case where the intake switching valve 18 is partially opened, the three-way solenoid valve 26 is switched to "OFF" to close the intake switching valve 18. Then, at step 104, the three-way solenoid valve 27 is switched to "ON" to introduce the intake pressure at a portion of the intake conduit downstream of the compressor (the charging pressure) into the diaphragm chamber 10a of the actuator 10 thereby closing the intake bypass valve 33.

Then, the routine proceeds to step 105. At step 105, after a short interval necessary to run-up the second turbocharger 8, for example, one second after the switching-on of the three-way solenoid valve 27, the three-way solenoid valve 28 is switched to "ON" to introduce the charging pressure into the diaphragm chamber 16a of the actuator 16 thereby opening the exhaust switching valve 17. If the compressor outlet pressure of the second turbocharger 8 increases over that of the compressor outlet pressure of the first turbocharger 7, the charging air pressurized by the second turbocharger 8 passes through the check valve 12 and is suppled to the engine 1. Then, at step 106, after a short interval, for example, 0.5 seconds after the switching-on of the three-way solenoid valve 28, the three-way solenoid valve 25 is switched to "ON" to introduce the charging pressure into the diaphragm chamber 11a of the actuator 11 thereby opening the intake switching valve 18. At that point, both the first turbocharger 7 and the second turbocharger 8 are in operation. Then, the routine proceeds to step 114 and returns.

If the engine operational condition is a "one-turbocharger-operation" condition at the aforementioned step 102, then the routine proceeds to step 107. At step 107, the three-way valve 25 is switched to "OFF" to close the intake switching valve 18. Then, at step 108, the three-way solenoid valve 28 is switched to "OFF" to close the exhaust switching valve 17. Then, at step 109, the three-way solenoid valve 27 is switched to "OFF" to open the intake bypass valve 33. Following steps 107, 108 and 109, the "one-turbocharger-operation" is produced. In this state, even if the second turbocharger 8 is rotated by the engine exhaust pressure, the air pressurized by the compressor 8b returns to the first intake passage 15 through the intake bypass conduit 13.

Then, the routine proceeds to step 110 where the intake gas pressure PM is entered into the computer. Then, the routine proceeds to step 111 where it is determined whether or not the engine load is low, for example, whether the intake pressure PM is smaller than a second intake pressure, for example −100 mm Hg. If the intake pressure PM is equal to or larger than −100 mm Hg and, therefore, the engine load is high, then the routine proceeds to step 113 where the three-way solenoid valve 26 is switched to "OFF" to close the intake switching valve 18. At this point, because the intake switching valve 18 is closed and the exhaust switching valve 17 is closed, the turbocharged system operates according to the "one-turbocharger-operation" and a good torque response is obtained.

If the PM is smaller than −100 mm Hg and, therefore, the engine load is low at step 111, the routine proceeds to step 112. At step 112, the three-way solenoid valve 26 is switched to "ON" to connect the negative pressure of the surge tank 2 to a diaphragm chamber 11b of the actuator 11 thereby opening the intake switching valve 18. At this point, because the exhaust switching valve 17 is closed, the second turbocharger 8 is not driven, and only the first turbocharger 7 is in operation. However, since the intake switching valve 18 is opened, the intake air can be sucked through both the first intake conduit 14a and the second intake conduit 14b. As a result, a great amount of intake air can be supplied to the engine 1 and the acceleration characteristic for a low engine load is improved. Then, the routine proceeds to step 114 and returns.

In accordance with the present invention, the following advantages are obtained.

First, because the internal combustion engine with a dual turbocharger system is provided with a second exhaust bypass valve control means including the routine of FIG. 2, any decrease in the rotational speed of the first turbocharger 8 at the beginning of running-up of the second turbocharger 8 is small and any decrease in the charging pressure at the transition from "one-turcocharger-operation" to "two-turbocharger-operation" is also small. As a result, torque shock is suppressed.

Second, because the internal combustion engine with a dual turbocharger system is provided with a first exhaust bypass valve control means including the step means 52, 53 and 55 of FIG. 1, not only is any torque decrease prevented but also skipping a step of running-up of the second turbocharger 8 is avoided during transition from "one-turbocharger-operation" to "two-turbocharger-operation". As a result, a smooth transition can occur.

Third, because the second turbocharger 8 is run-up not by partially opening the exhaust switching valve but by opening the exhaust bypass valve 41, the amount of the exhaust gas flowing through the second turbocharger turbine 8a can be easily and accurately controlled.

Fourth, because the exhaust switching valve 17 and the exhaust bypass valve 41 are provided downstream of the second turbocharger turbine 8a and the temperature of the exhaust gas decreases at the second turbocharger turbine, the thermal durability of the exhaust switching valve and the exhaust bypass valve is increased.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. A multi-cylinder internal combustion engine comprising:
   an air intake and an exhaust outlet;
   a first and a second turbocharger arranged in parallel with each other, each including a turbine and a turbine driven compressor, the turbines being connected with the air exhaust outlet and the compressors being connected with the air intake;
   an intake switching valve installed downstream of the second turbocharger compressor and an exhaust switching valve installed downstream of the second turbocharger turbine, the intake switching valve and the exhaust switching valve being closed at intake air quantities below a first predetermined intake air quantity, whereby only the first turbocharger is in operation, and being opened at intake air quantities above the first predetermined intake air quantity, whereby both the first and the second turbochargers are in operation;
   an exhaust bypass conduit bypassing the exhaust switching valve and an exhaust bypass valve installed in the exhaust bypass conduit;
   exhaust bypass valve control means for partially opening the exhaust bypass valve and then gradually increasing an amount by which the exhaust bypass valve is opened when the exhaust bypass valve is opened; and
   exhaust bypass valve opening amount determining means for determining whether or not an amount by which the exhaust bypass valve is opened is equal to or greater than a predetermined opening amount and allowing both the first turbocharger and the second turbocharger to operate only when the opening amount by which the exhaust bypass valve is open is equal to or greater than the predetermined opening amount.

2. An internal combustion engine according to claim 1 and further comprising:
a diaphragm actuator coupled to the exhaust bypass valve so as to selectively open and close the exhaust bypass valve, the diaphragm actuator including a diaphragm chamber connected to both a positive pressure tank and an intake passage which is at atmospheric pressure; and
a duty control two-way solenoid valve installed in a conduit connecting the diaphragm chamber and the intake passage.

3. An internal combustion engine according to claim 2, wherein the exhaust bypass valve control means first determines the current duty ratio of the duty control two-way solenoid valve as a first predetermined duty ratio and then gradually changes the duty ratio to a second predetermined duty ratio.

4. An internal combustion engine according to claim 3, wherein the exhaust bypass valve opening amount determining means determines whether or not the current duty ratio of the duty control two-way solenoid valve is equal to the second predetermined duty ratio and allows both the first turbocharger and the second turbocharger to operate only when the current duty ratio is equal to the second predetermined duty ratio.

5. An internal combustion engine according to claim 4, wherein the second predetermined duty ratio is zero.

6. A multi-cylinder internal combustion engine comprising:
an air intake and an exhaust outlet;
a first and a second turbocharger arranged in parallel with each other, each including a turbine and a turbine,drivqn compressor, the turbines being connected with the exhaust outlet and the compressors being connected with the air intake;
an intake switching valve installed downstream of the second turbocharger compressor and an exhaust switching valve installed downstream of the second turbocharger turbine, the intake switching valve and the exhaust switching valve being closed at intake air quantities below a first predetermined intake air quantity, whereby only the first turbocharger is in operation, and being opened at intake air quantities above the first predetermined intake air quantity, whereby both the first and the second turbochargers are in operation;
an exhaust bypass conduit bypassing the exhaust switching valve and an exhaust bypass valve installed in the exhaust bypass conduit;
first exhaust bypass valve control means for determining a condition for opening and closing of the exhaust bypass valve on the basis of a charging pressure at engine speeds at or below a predetermined engine speed and on the basis of an intake air quantity at engine speeds greater than the predetermined engine speed;
second exhaust bypass valve control means for partially opening the exhaust bypass valve and then gradually increasing an amount by which the exhaust bypass valve is opened when the exhaust bypass valve is opened; and
exhaust bypass valve opening amount determining means for determining whether or not an amount by which the exhaust bypass valve is opened is equal to or greater than a predetermined opening amount and allowing both the first turbocharger and the second turbocharger to operate only when the opening amount by which the exhaust bypass valve is open is equal to or greater than the predetermined opening amount.

7. An internal combustion engine according to claim 6 and further comprising:
a diaphragm actuator coupled to the exhaust bypass valve so as to selectively open and close the exhaust bypass valve, the diaphragm actuator including a diaphragm chamber connected to both a positive pressure tank and an intake passage which is at atmospheric pressure; and
a duty control two-way solenoid valve installed in a conduit connecting the diaphragm chamber and the intake passage.

8. An internal combustion engine according to claim 7, wherein the second exhaust bypass valve control means first determines the current duty ratio of the duty control two-way solenoid valve as a first predetermined duty ratio and then gradually changes the duty ratio to a second predetermined duty ratio.

9. An internal combustion engine according to claim 8, wherein the exhaust bypass valve opening amount determining means determines whether or not the current duty ratio of the duty control two-way solenoid valve is equal to the second predetermined duty ratio and allows both the first turbocharger and the second turbocharger to operate only when the current duty ratio is equal to the second predetermined duty ratio.

10. An internal combustion engine according to claim 9, wherein the second predetermined duty ratio is zero.

11. An internal combustion engine according to claim 6 and further comprising:
means for measuring an engine speed;
means for measuring a charging pressure; and
means for measuring an intake air quantity, and wherein the first exhaust bypass valve control means is operatively connected with the engine speed measuring means, the charging pressure measuring means, the intake air quantity measuring means and the exhaust bypass valve, and opens the exhaust bypass valve whenever the engine speed is at or below a predetermined engine speed and the charging pressure is greater than a first predetermined charging pressure and whenever the engine speed is greater than the predetermined engine speed and the intake air quantity is greater than a second predetermined intake air quantity smaller than the first predetermined intake air quantity and closes the exhaust bypass valve whenever the engine speed is at or below the predetermined engine speed and the charging pressure is equal to or less than the first predetermined charging pressure and whenever the engine speed is greater than the predetermined engine speed and the intake air quantity is equal to or less than the second predetermined intake air quantity.

12. An internal combustion engine according to claim 11, wherein the predetermined engine speed is substantially 4,000 rpm.

13. An internal combustion engine according to claim 11, wherein the first predetermined charging pressure is substantially 500 mm Hg.

14. An internal combustion engine according to claim 11, wherein the second predetermined intake air quantity is 4,000 l/min.

15. An internal combustion engine according to claim 6 and further comprising an exhaust line including a first exhaust conduit in which the first turbocharger turbine is installed, a second exhaust conduit in which the second turbocharger turbine is installed, an exhaust connecting portion where the first exhaust conduit and the second exhaust conduit join each other, and an exhaust pipe located downstream of and connected with the exhaust connecting portion, and wherein the exhaust bypass conduit connects a portion of the second exhaust conduit downstream of the second turbocharger turbine and upstream of the exhaust switching valve with either one of a portion of the second exhaust conduit downstream of the exhaust switching valve, the exhaust connecting portion joining the first and second exhaust conduits, and a portion of the first exhaust conduit downstream of the first turbocharger turbine.

16. A multi-cylinder internal combustion engine, the engine including a first and a second group of cylinders, the engine comprising:

an air intake and at least one exhaust outlet;

an exhaust manifold connected with the engine exhaust outlet, the exhaust manifold including a first portion connected to the first group of the cylinders and a second portion connected to the second group of the cylinders, the first portion and the second portion of the exhaust manifold communicating with each other by a connecting conduit;

a first and a second turbocharger arranged in parallel with each other, each including a turbine and a turbine driven compressor, the turbines being connected with the exhaust outlet by the exhaust manifold with the compressors being connected with the air intake;

an intake line including a first intake conduit connected with the first turbocharger compressor, a second intake conduit connected with the second turbocharger compressor, an intake connecting portion joining the first intake conduit and the second intake conduit, and an intake common conduit connecting the intake connecting portion and the air intake of the engine;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connecting portion where the first exhaust conduit and the second exhaust conduit join each other, and an exhaust pipe located downstream of and connected with the exhaust connecting portion;

an intake switching valve installed downstream of the second turbocharger compressor in the second intake conduit for opening and closing the second intake conduit;

an exhaust switching valve installed downstream of the second turbocharger turbine in the second exhaust conduit for opening and closing the second exhaust conduit;

an exhaust bypass conduit connecting a portion of the second exhaust conduit downstream of the second turbocharger turbine and upstream of the exhaust switching valve with either one of a portion of the second exhaust conduit downstream of the exhaust switching valve, the exhaust connecting portion joining the first and second exhaust conduits, and a portion of the first exhaust conduit downstream of the first turbocharger turbine;

an exhaust bypass valve installed in the exhaust bypass conduit for opening and closing the exhaust bypass conduit;

means for measuring an engine speed;

means for measuring a charging pressure;

means for measuring an intake air quantity;

means for opening the intake switching valve whenever the intake air quantity is greater than a first intake air quantity and whenever the intake air quantity is equal to or less than the first predetermined intake air quantity and the charging pressure is less than a second predetermined charging pressure, and for closing the intake switching valve whenever the intake air quantity is equal to or less than the first predetermined intake air quantity and the charging pressure is greater than the second predetermined charging pressure;

means for opening the exhaust switching valve whenever the intake air quantity is greater than the first predetermined intake air quantity and for closing the exhaust switching valve whenever the intake air quantity is equal to or less than the first predetermined intake air quantity;

first exhaust bypass valve control means for opening the exhaust bypass valve whenever the engine speed is at or below a predetermined engine speed and the charging pressure is greater than a first predetermined charging pressure and whenever the engine speed is greater than the predetermined engine speed and the intake air quantity is greater than a second predetermined intake air quantity, and for closing the exhaust bypass valve whenever the engine speed is at or below the predetermined engine speed and the charging pressure is equal to or less than the first predetermined charging pressure and whenever the engine speed is greater than the predetermined engine speed and the intake air quantity is equal to or less than the second predetermined intake air quantity;

second exhaust bypass valve control means for partially opening the exhaust bypass valve and then gradually increasing an amount by which the exhaust bypass valve is opened when the exhaust bypass valve is opened; and exhaust bypass valve opening amount determining means for determining whether or not an amount by which the exhaust bypass valve is opened is equal to or greater than a predetermined opening amount and allowing both the first turbocharger and the second turbocharger to operate only when the opening amount by which the exhaust bypass valve is open is equal to or greater than the predetermined opening amount.

17. An internal combustion engine according to claim 6 and further comprising:

a diaphragm actuator coupled to the exhaust bypass valve so as to selectively open and close the exhaust bypass valve, the diaphragm actuator including a diaphragm chamber connected to both a positive pressure tank and the intake passage which is at atmospheric pressure; and a duty control two-way solenoid valve installed in a conduit connecting the diaphragm chamber and the intake passage, and wherein the second bypass valve conrol means is adapted to set the current duty ratio of the duty control two-way selenoid valve to a first predetermined duty ratio and then gradually change the duty ratio to a second predetermined duty ratio.

18. An internal combustion engine according to claim 16, wherein the first predetermined intake air quantity is substantially 5,500 l/min, the second predetermined intake air quantity is substantially 4,000 l/min, the first predetermined charging pressure is substantiallt 500 mm Hg, the second predetermined charging pressure is substantially −100 mm Hg, and the predetermined engine speed is substantially 4,000 rpm.

19. An internal combustion engine according to claim 16, and further comprising:
an intake bypass conduit connecting a portion of the second intake conduit downstream of the second turbocharger compressor and upstream of the intake switching valve with a portion of the intake line upstream of the second turbocharger compressor and the first turbocharger compressor;
an intake bypass valve installed in the intake bypass conduit for opening and closing the intake bypass conduit; and
means for opening the intake bypass valve at intake air quantities equal to or less than the second predetermined intake air quantity and closing the intake bypass valve at intake air quantities greater than the second predetermined intake air quantity.

20. An internal combustion engine according to claim 16, and further comprising:
an intake switching valve bypass conduit bypassing the intake switching valve; and
a one-way valve installed in the intake switching valve bypass conduit and adapted to permit air to flow only from an upstream portion of the intake air switching valve to a downstream portion of the intake air switching valve.

* * * * *